US010866705B2

(12) United States Patent
Rogers et al.

(10) Patent No.: US 10,866,705 B2
(45) Date of Patent: Dec. 15, 2020

(54) SYSTEMS AND METHODS FOR UPDATING RECOMMENDATIONS ON A USER INTERFACE IN REAL-TIME BASED ON USER SELECTION OF RECOMMENDATIONS PROVIDED VIA THE USER INTERFACE

(71) Applicant: CLARIFAI, INC., New York, NY (US)

(72) Inventors: John Rogers, New York, NY (US); Keith Ito, New York, NY (US); Marshall Jones, New York, NY (US); Daniel Kantor, New York, NY (US); Matthew Zeiler, New York, NY (US)

(73) Assignee: Clarifai, Inc., New York, NY (US)

( * ) Notice: Subject to any disclaimer, the term of this patent is extended or adjusted under 35 U.S.C. 154(b) by 517 days.

(21) Appl. No.: 15/369,735

(22) Filed: Dec. 5, 2016

(65) Prior Publication Data
US 2017/0161631 A1    Jun. 8, 2017

Related U.S. Application Data

(60) Provisional application No. 62/262,858, filed on Dec. 3, 2015.

(51) Int. Cl.
*G06F 3/0484* (2013.01)
(52) U.S. Cl.
CPC ................ *G06F 3/0484* (2013.01)
(58) Field of Classification Search
CPC .......... G06N 7/02; G06N 5/04; G06F 3/0484; G06F 8/313; G06F 3/0605; G06F 3/0629; G05B 13/028

USPC .......................................... 706/52
See application file for complete search history.

(56) References Cited

U.S. PATENT DOCUMENTS

| | | | | |
|---|---|---|---|---|
| 8,996,530 | B2 * | 3/2015 | LuVogt | G06F 17/30867 707/740 |
| 9,336,483 | B1 * | 5/2016 | Abeysooriya | G06N 3/08 |
| 9,785,883 | B2 * | 10/2017 | LuVogt | G06N 3/006 |

(Continued)

OTHER PUBLICATIONS

An intelligent music playlist generator based on the time parameter with artificial neural networks, by Liu, published 2009.*

*Primary Examiner* — Viker A Lamardo
(74) *Attorney, Agent, or Firm* — Pillsbury Winthrop Shaw Pittman LLP

(57) ABSTRACT

In certain implementations, a user request to add a new concept may be received. A set of media item recommendations may be caused to be loaded on a user interface for presentation to a user responsive to the user request to add the new concept. The media item recommendation set may include a set of recommendations loaded on an on-screen portion of the user interface and a set of recommendations loaded on an off-screen portion of the user interface. The on-screen user interface portion is visible to the user at a first time. The off-screen user interface portion is not being visible to the user at the first time. A user selection of one or more recommendations of the on-screen recommendation set is received. The off-screen recommendation set may be caused to be updated on the user interface during the presentation of the media item recommendation set based on the user recommendation selection.

20 Claims, 16 Drawing Sheets

(56) References Cited

U.S. PATENT DOCUMENTS

| | | | |
|---|---|---|---|
| 2004/0170386 A1* | 9/2004 | Mikawa | G06F 17/30265 |
| | | | 386/241 |
| 2006/0155754 A1* | 7/2006 | Lubin | G06F 17/30749 |
| 2008/0270120 A1* | 10/2008 | Pestian | G06F 17/2785 |
| | | | 704/9 |
| 2009/0217804 A1* | 9/2009 | Lu | G10H 1/0058 |
| | | | 84/602 |
| 2010/0070917 A1* | 3/2010 | Gates | G06F 17/30053 |
| | | | 715/810 |
| 2010/0312730 A1* | 12/2010 | Weng | G06N 3/02 |
| | | | 706/15 |
| 2011/0225496 A1* | 9/2011 | Jeffe | G11B 27/034 |
| | | | 715/716 |
| 2015/0227531 A1* | 8/2015 | Kulesza | G06F 3/04817 |
| | | | 715/739 |
| 2016/0179844 A1* | 6/2016 | Shen | G06F 17/30247 |
| | | | 382/156 |
| 2017/0039468 A1* | 2/2017 | Zeiler | G06F 17/30598 |
| 2017/0132288 A1* | 5/2017 | Ho | G06F 17/30528 |

\* cited by examiner

SYSTEMS AND METHODS FOR UPDATING RECOMMENDATIONS ON A USER INTERFACE IN REAL-TIME BASED ON USER SELECTION OF RECOMMENDATIONS PROVIDED VIA THE USER INTERFACE

RELATED APPLICATIONS

This application claims the benefit of U.S. Provisional Patent Application Ser. No. 62/262,858, filed Dec. 3, 2015, which is hereby incorporated by reference herein in its entirety.

FIELD OF THE DISCLOSURE

This disclosure relates to systems and methods for providing a user interface that facilitates learning user preferences via real-time recommendations of media items.

BACKGROUND

Although a number of recommendation computer systems exist, typical recommendation computer systems do not provide a user with updated recommendations such that (i) the updated recommendations provided during a current session and (ii) are based on the user's selection of presented recommendations during the same session. Moreover, although a number of machine-learning systems exist, typical machine-learning systems do not provided a user with updated recommendations of items potentially relevant to a concept (e.g., a new concept to be learned, a concept to be updated, etc.) such that (i) the updated recommendations provided during a current session and (ii) are based on the user's selection of presented recommendations during the same session. As such, for example, the updated recommendations provided by typical recommendation computer systems may be "out-of-date" during that current session with respect to the user's selections during that session (e.g., such updated recommendations do not take into account the user's selections during that session), resulting in update delays that may negatively affect the user experience. These and/or other drawbacks exist.

SUMMARY

One aspect of the disclosure relates to a system configured for providing a user interface that facilitates learning user preferences via real-time recommendations of media items based on positive examples identified by user selections and negative examples identified by lack of user selections. In some implementations, preferences of a user may be learned through some interaction (e.g., user selection, lack of user selection) with displayed media items (or representations thereof) in order to predict new media items to show. The new media items may or may not currently appear on the screen. If the new media items appear on the screen, they can re-sort the order of the displayed media items. If the new media items appear off the current screen, the user may not see the re-sorting of the media items, but when the user scrolls, paginates, or otherwise manipulates the user interface to the next view of media items, the on-screen media items will appear more relevant to the initial selected items. Some implementations may not rely on other users. This may be achieved by heavily relying on machine learning to quickly learn over items that have feedback associated with them and then predict over the remaining items that the user has not interacted with. Some implementations may utilize neural networks for such learning, while some may not be dependent on neural networks.

In some implementations, the system may be configured to quickly learn the user's preferences in order to teach the system about the user's interests, perspectives, personal life, and/or other information relevant to the user. By way of non-limiting example, learning the user's preferences may teach the system about the user's friends and family, or it may teach the system about new concepts the system does not already understand. This may be achieved by clicking on positive examples of images that contain the concept as well as skipping over (e.g., not clicking) the ones that do not contain the concept acts as negative examples to teach the system what the user has in mind. As an illustration, if the user is trying to train the system to know the name of the user's specific pet dog, the user might do a search for "dog" to retrieve media items that contain the user's specific pet dog. Then the user may click on their specific dog, while skipping over other dogs that are not theirs. The system may refine on-screen media items and/or off-screen media items to show next in order to refine the displayed media items towards the user's specific pet dog.

The system may comprise one or more hardware processors configured by machine-readable instructions to present the user interface via a hardware display of a computing platform. The one or more hardware processors may be configured by machine-readable instructions to present within the user interface one or more concept categories. The one or more hardware processors may be configured by machine-readable instructions to receive a user selection of a given concept category. The one or more hardware processors may be configured by machine-readable instructions to receive a user selection to add a new concept within the given concept category. The one or more hardware processors may be configured by machine-readable instructions to present within the user interface recommendations of media items that may or may not convey the new concept. The one or more hardware processors may be configured by machine-readable instructions to receive, as a positive example, a user selection of a recommendation of a media item that does convey the new concept. The one or more hardware processors may be configured by machine-readable instructions to identify, as a negative example, a recommendation of a media item that does not convey the new concept by virtue of not corresponding to a user selection. The one or more hardware processors may be configured by machine-readable instructions to update within the user interface non-selected recommendations based on the positive example and the negative example. The one or more hardware processors may be configured by machine-readable instructions to receive a user selection indicating user satisfaction that the new concept has been learned based on a plurality of positive examples being presented via the user interface.

Another aspect of the disclosure relates to a method for providing a user interface that facilitates learning user preferences via real-time recommendations of media items based on positive examples identified by user selections and negative examples identified by lack of user selections. The method may be performed by one or more hardware processors configured by machine-readable instructions. The method may comprise presenting the user interface via a hardware display of a computing platform. The method may comprise presenting within the user interface one or more concept categories. The method may comprise receiving a user selection of a given concept category. The method may comprise receiving a user selection to add a new concept within the given concept category. The method may comprise presenting within the user interface recommendations of media items that may or may not convey the new concept. The method may comprise receiving, as a positive example, a user selection of a recommendation of a media item that does convey the new concept. The method may comprise identifying, as a negative example, a recommendation of a media item that does not convey the new concept by virtue of not corresponding to a user selection. The method may comprise updating within the user interface non-selected recommendations based on the positive example and the negative example. The method may comprise receiving a user selection indicating user satisfaction that the new concept has been learned based on a plurality of positive examples being presented via the user interface.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise. In addition, as used in the specification and the claims, the term "or" means "and/or" unless the context clearly dictates otherwise.

DETAILED DESCRIPTION

Figure 1:
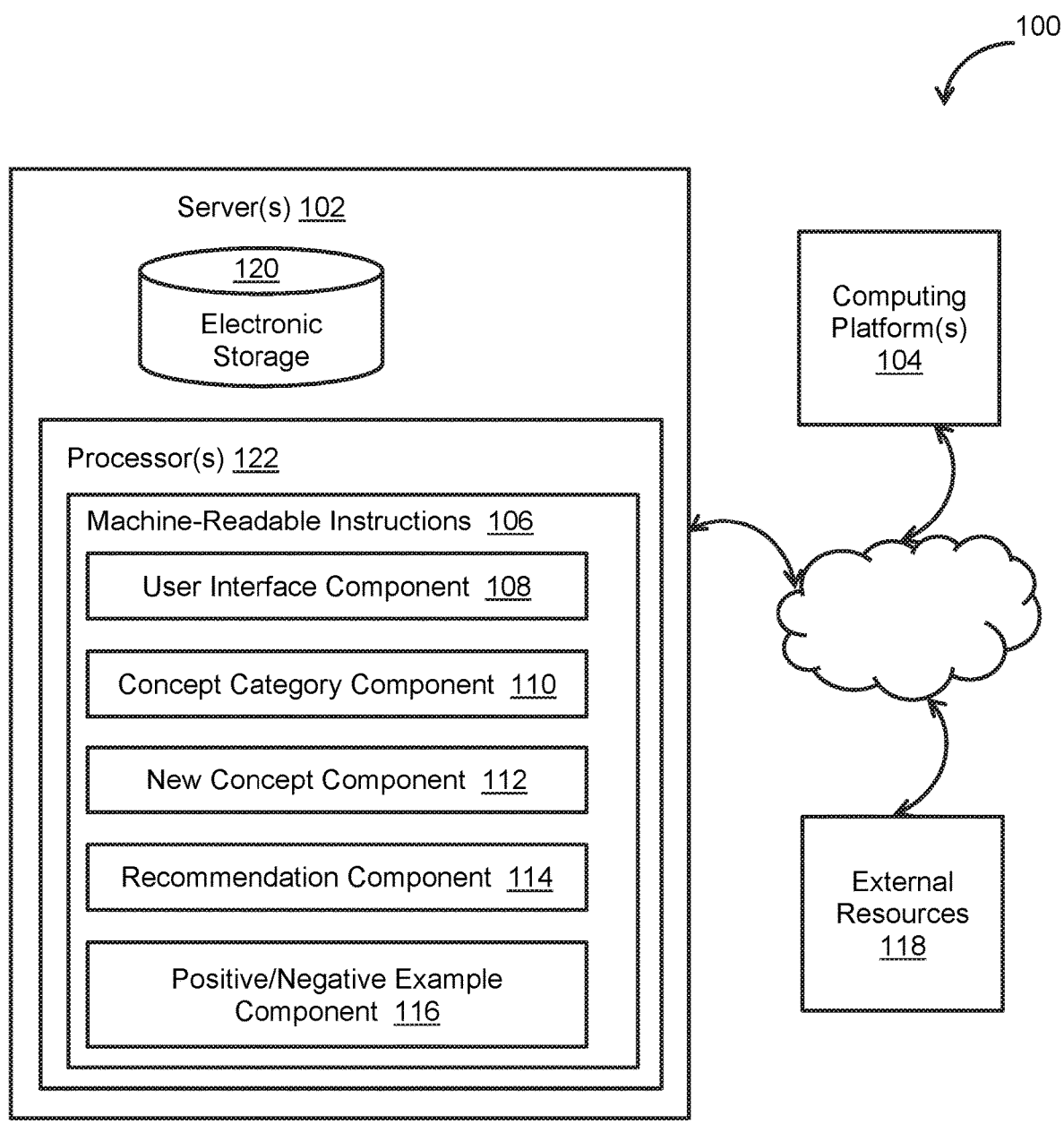
FIG. 1 illustrates a system configured for providing a user interface that facilitates learning user preferences via real-time recommendations of media items, in accordance with one or more implementations.

FIG. 1 illustrates a system 100 configured for providing a user interface that facilitates learning user preferences via real-time recommendations of media items, in accordance with one or more implementations. In some implementations, system 100 may include one or more servers 102. The server(s) 102 may be configured to communicate with one or more computing platforms 104 according to a client/server architecture. Users may access system 100 via computing platform(s) 104. The server(s) 102 may be configured to execute machine-readable instructions 106. The machine-readable instructions 106 may include one or more of a user interface component 108, a concept category component 110, a new concept component 112, a recommendation component 114, a positive/negative example component 116, and/or other components.

The user interface component 108 may be configured to present a user interface via a hardware display of a given computing platform 104. The user interface may include a graphical user interface. The hardware display of the computing platform may include a touch screen. The touch screen may be configured to receive user selections responsive to a user touching regions of the touch screen that correspond to information being displayed within the regions.

The concept category component 110 may be configured to present within the user interface one or more concept categories. The one or more concept categories may be represented as category tiles within the graphical user interface. The concept categories may include one or more of recently created concepts, people, places, things, times, favorites, interests, categories provided by other users, duplicate media items, and/or other concept categories. Generally speaking, a concept may include a general notion or idea that corresponds to some class of entities and that has the characteristic or essential features of the class. By way of non-limiting example, a concept may include one or more of a person's identity, a name of a specific thing, a type of thing, an idea described by a noun, an idea described by a verb, an idea described by an adverb, an idea of what a user is interested in, and/or other concepts.

The concept category component 110 may be configured to receive a user selection of a given concept category. The concept category component 110 may be configured to present within the user interface one or more representations of media items corresponding to the given concept category. A given media item may include one or more of an image, a video, text, audio, animations, graphics, data points, and/or other media items. The one or more representations of media items may correspond to one or more media items stored in one or more media item repositories. A given media item repository may be located within server(s) 102, computing platform(s) 104, external resources 118, and/or other locations. Presenting a given representation of a given media item may include presenting a thumbnail image of the given media item or a portion of the given media item. For example, when the selected concept category is "people," the given representation of the given media item may include a thumbnail image of a portion of an image showing a person's face. As another example, when the given media item is a video, the given representation of the given media item may include a portion of a given frame of the video.

The new concept component 112 may be configured to receive a user selection to add a new concept within the given concept category. In some implementations, new concept component 112 may be configured to receive a user definition of the new concept. The user definition of the new concept may include a word or phrase describing the new concept.

The recommendation component 114 may be configured to present within the user interface recommendations of media items that may or may not convey the new concept. A given recommendation of a given media item may include a representation of the given media item, as described above in connection with concept category component 110. For example, presenting a given recommendation of a given media item may include presenting a thumbnail image of the given media item or a portion of the given media item. The one or more recommendations of media items may correspond to one or more media items stored in one or more media item repositories. The recommendations may be determined based on machine learning, search interactions, sharing behavior, interactions with the user interface, and/or other techniques for identifying media items that potentially convey a desired concept. A recommendation may be referred to as a recommend and/or a suggestion.

The positive/negative example component 116 may be configured to receive, as a positive example, a user selection of a recommendation of a media item that does convey the new concept. Generally speaking, a given recommendation is a positive example of the new concept if it corresponds to a media item that conveys the new concept. A media item conveys the new concept if it expresses, portrays, depicts, connotes, suggests, and/or otherwise communicates the new concept. The positive/negative example component 116 may be configured to identify, as a negative example, a recommendation of a media item that does not convey the new concept by virtue of not corresponding to a user selection. Generally speaking, a given recommendation is a negative example of the new concept if it corresponds to a media item that does not convey the new concept.

The recommendation component 114 may be configured to update within the user interface non-selected recommendations based on the positive example and the negative example. Non-selected recommendations are recommendations that have not been selected by the user and, therefore, do not correspond to a user selection of a recommendation. The updating may occur in real time or near-real time. In some implementations, updating the non-selected suggestions may include updating on-screen recommendations to include recommendations that are more relevant to the new concept. The on-screen recommendations may include the recommendations that are visible within the user interface. In some implementations, updating the non-selected suggestions may include re-ranking off-screen recommendations based on relevancy to the new concept. The off-screen recommendations may include the recommendations that are not visible within the user interface. In some implementations, updating the non-selected recommendations may include replacing the non-selected recommendations with new recommendations. The new recommendations may be selected based on the positive example and the negative example. In some implementations, updating the non-selected recommendations may include reordering the non-selected recommendations. The reordering may be performed based on the positive example and the negative example.

The updating of recommendations may be an iterative process. For example, positive/negative example component 116 may be configured to receive, as a second positive example, a user selection of an updated recommendation of a media item that does convey the new concept. The positive/negative example component 116 may be configured to identify, as a second negative example, an updated recommendation of a media item that does not convey the new concept by virtue of not corresponding to a user selection. The recommendation component 114 may be configured to update within the user interface non-selected recommendations based on the second positive example and the second negative example.

The new concept component 112 may be configured to receive a user selection indicating user satisfaction that the new concept has been learned based on a plurality of positive examples being presented via the user interface. In some implementations, new concept component 112 may automatically determine whether a new concept has been satisfactorily learned based on a breached threshold of positive examples and/or negative examples.

In some implementations, server(s) 102, computing platform(s) 104, and/or external resources 118 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, computing platform(s) 104, and/or external resources 118 may be operatively linked via some other communication media.

A given computing platform 104 may include one or more processors configured to execute machine-readable instructions. The machine-readable instructions may be configured to enable an expert or user associated with the given computing platform 104 to interface with system 100 and/or external resources 118, and/or provide other functionality attributed herein to computing platforms 104. By way of non-limiting example, the given computing platform 104 may include one or more of a desktop computer, a laptop computer, a handheld computer, a tablet computing platform, a NetBook, a Smartphone, a gaming console, and/or other computing platforms.

External resources 118 may include sources of information, hosts and/or providers of media items outside of system 100, external entities participating with system 100, and/or other resources. In some implementations, some or all of the functionality attributed herein to external resources 118 may be provided by resources included in system 110.

Server(s) 102 may include electronic storage 120, one or more processors 122, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

In some implementations, a given computing platform 104 may include electronic storage that is the same as or similar to electronic storage 120. A given computing platform 104 may include one or more processors that are the same as or similar to processor(s) 122.

Electronic storage 120 may comprise non-transitory storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from server(s) 102, information received from computing platform(s) 104, and/or other information that enables server(s) 102 to function as described herein.

Processor(s) 122 is configured to provide information processing capabilities in server(s) 102. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. The processor(s) 122 may be configured to execute machine-readable instructions and components thereof including components 108, 110, 112, 114, 116, and/or other components. Processor(s) 122 may be configured to execute components 108, 110, 112, 114, 116, and/or other components by software; hardware; firmware; some combination of software, hardware, and/or firmware; and/or other mechanisms for configuring processing capabilities on processor(s) 122. As used herein, the term "machine-readable instruction component" may refer to any component or set of components that perform the functionality attributed to the machine-readable instruction component. This may include one or more physical processors during execution of processor readable instructions, the processor readable instructions, circuitry, hardware, storage media, or any other components.

It should be appreciated that although machine-readable instruction components 108, 110, 112, 114, and 116 are illustrated in FIG. 1 as being implemented within a single processing unit, in implementations in which processor(s) 122 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 122 may be configured to execute one or more additional machine-readable instruction components that may perform some or all of the functionality attributed below to one of components 108, 110, 112, 114, and/or 116.

Figure 2A:
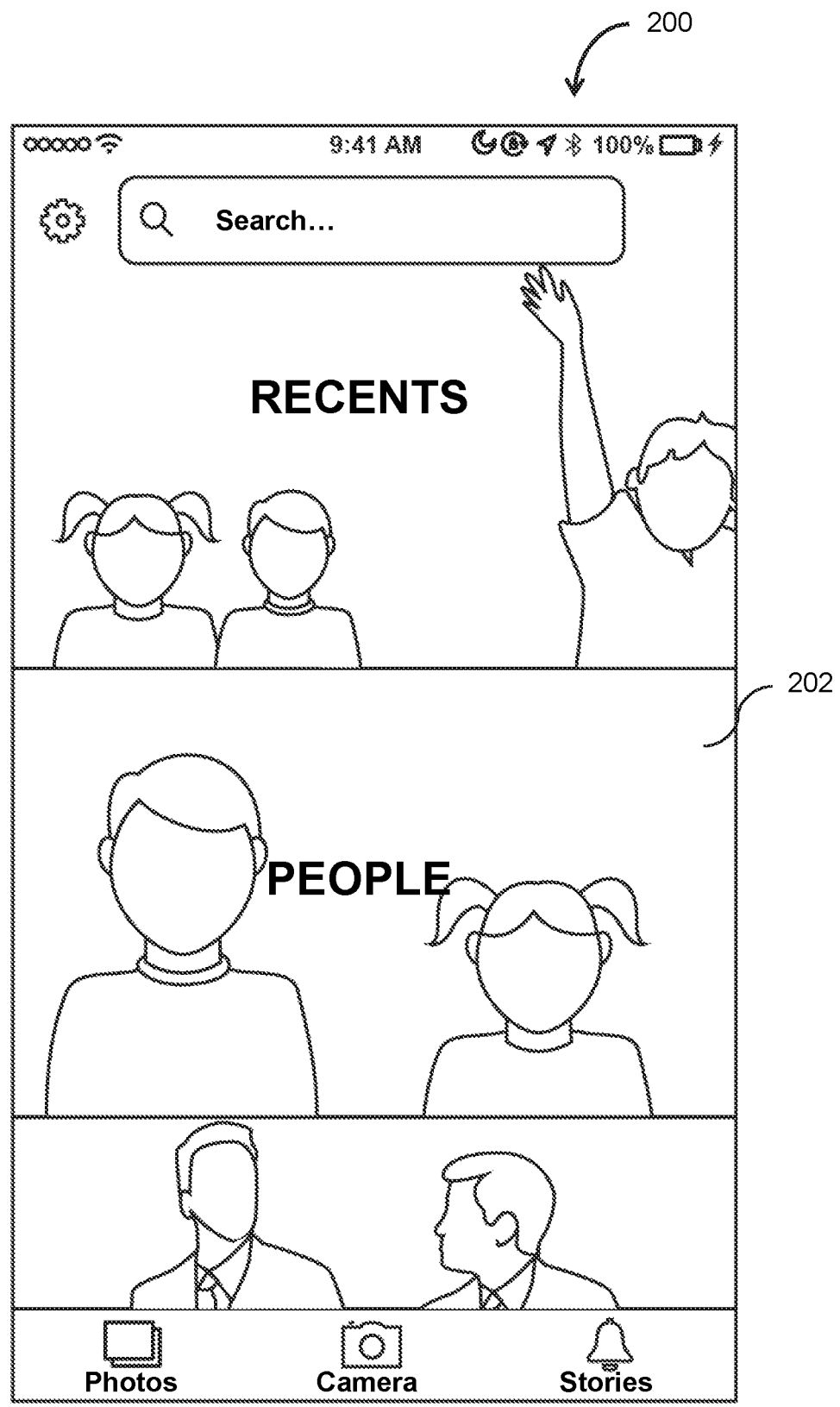
FIGS. 2A, 2B, 2C, 2D, 2E, 2F, and 2G illustrate a user interface, in accordance with one or more implementations.
Figure 2B:
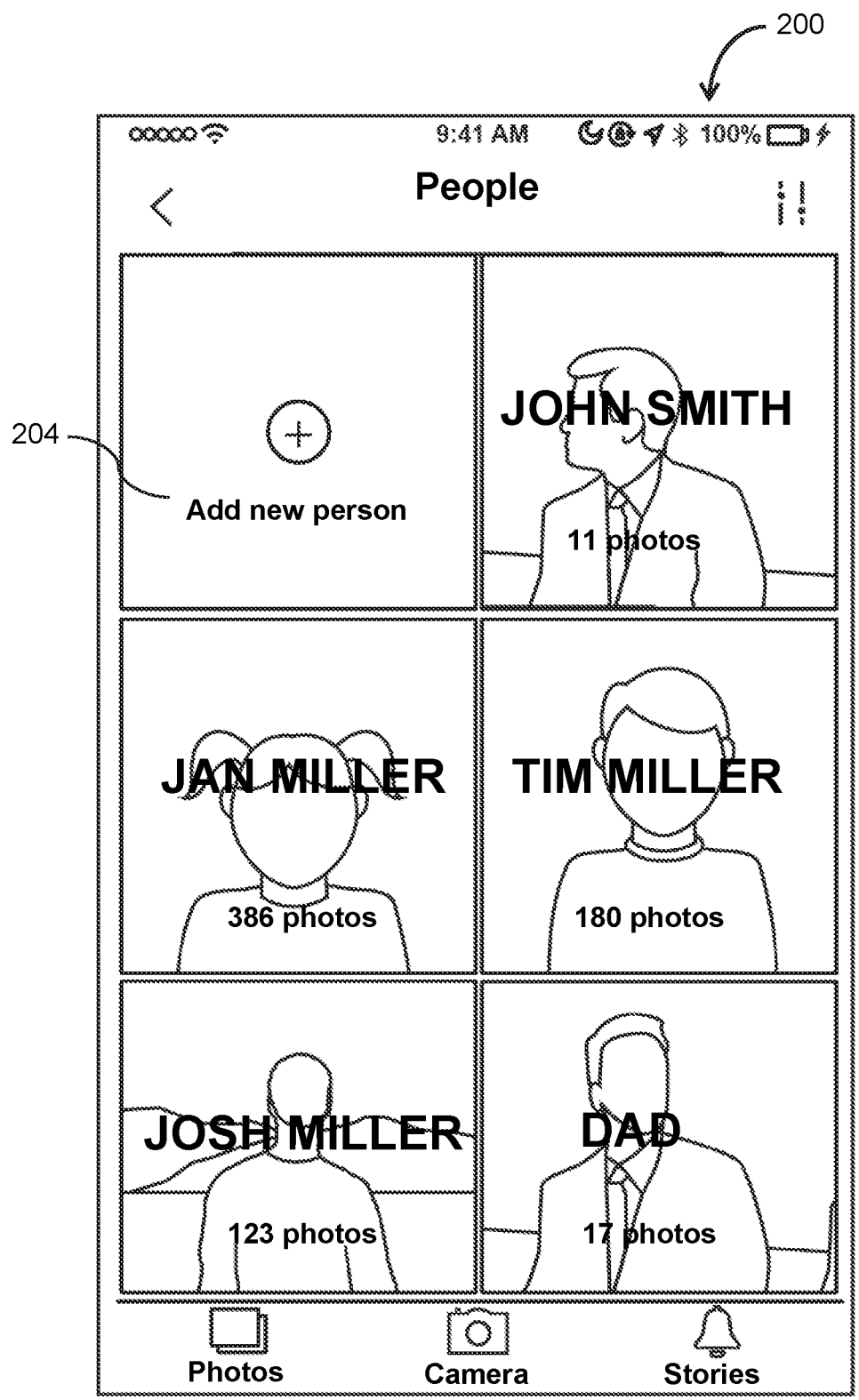
Figure 2C:
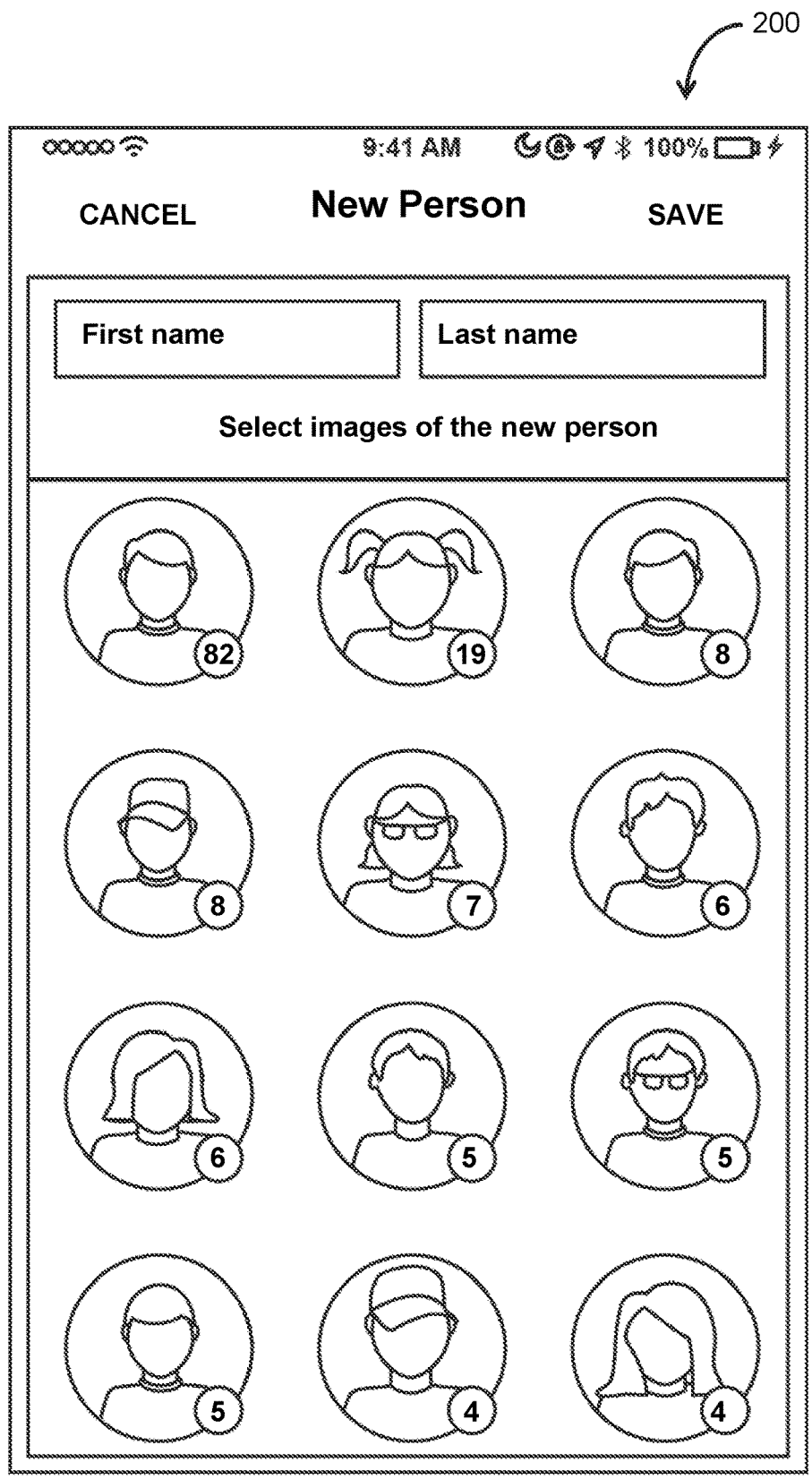
Figure 2D:
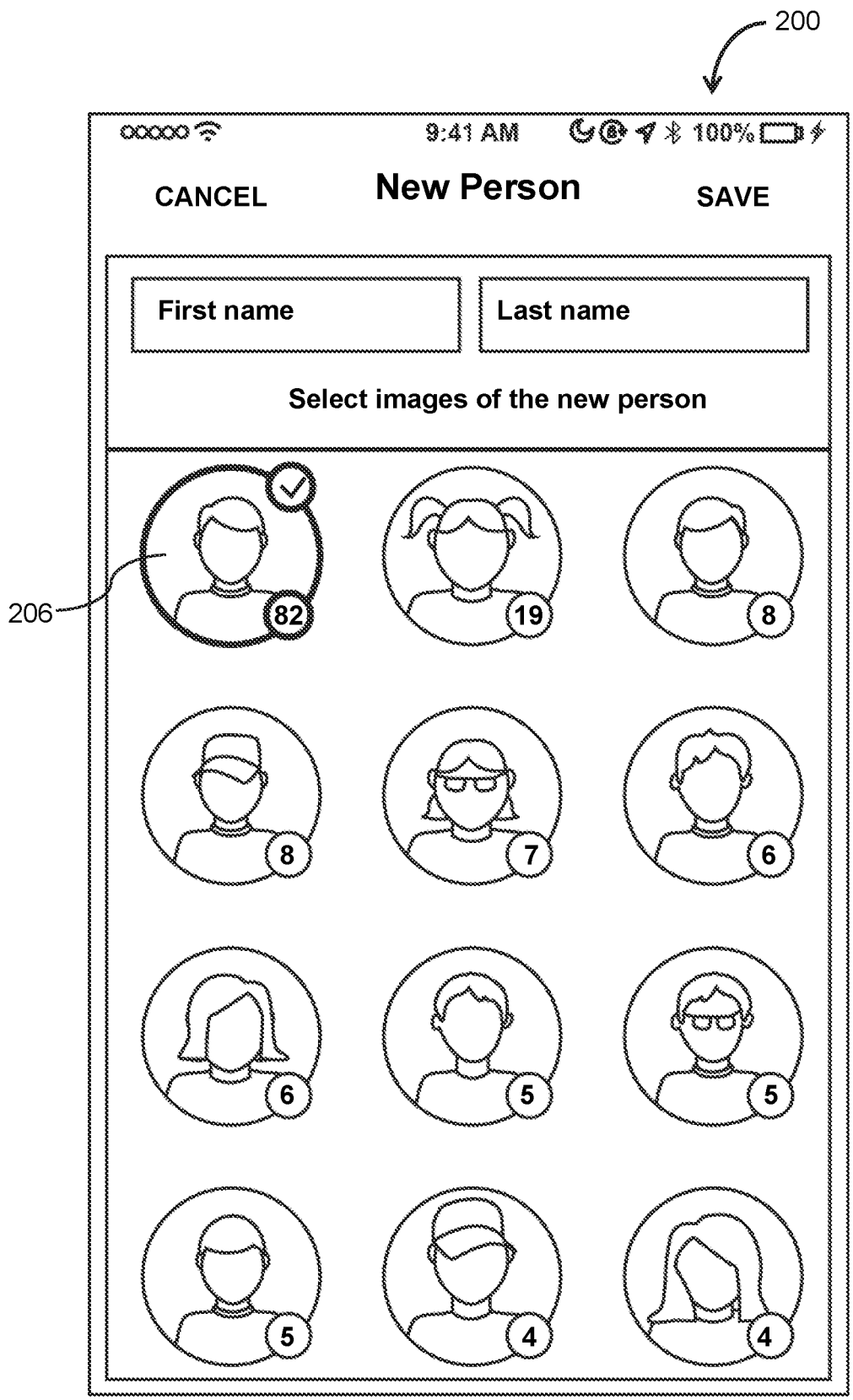
Figure 2E:
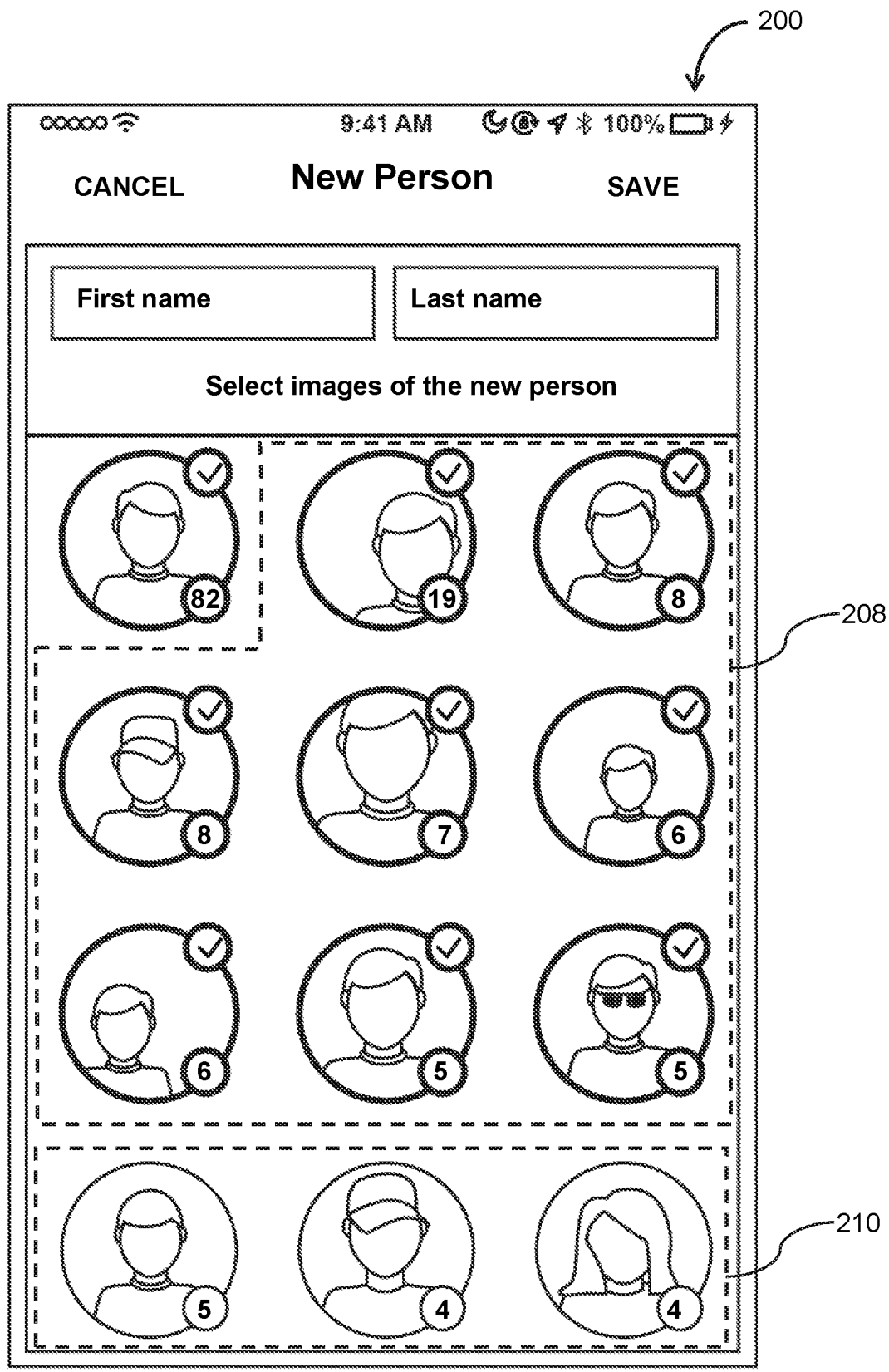
Figure 2F:
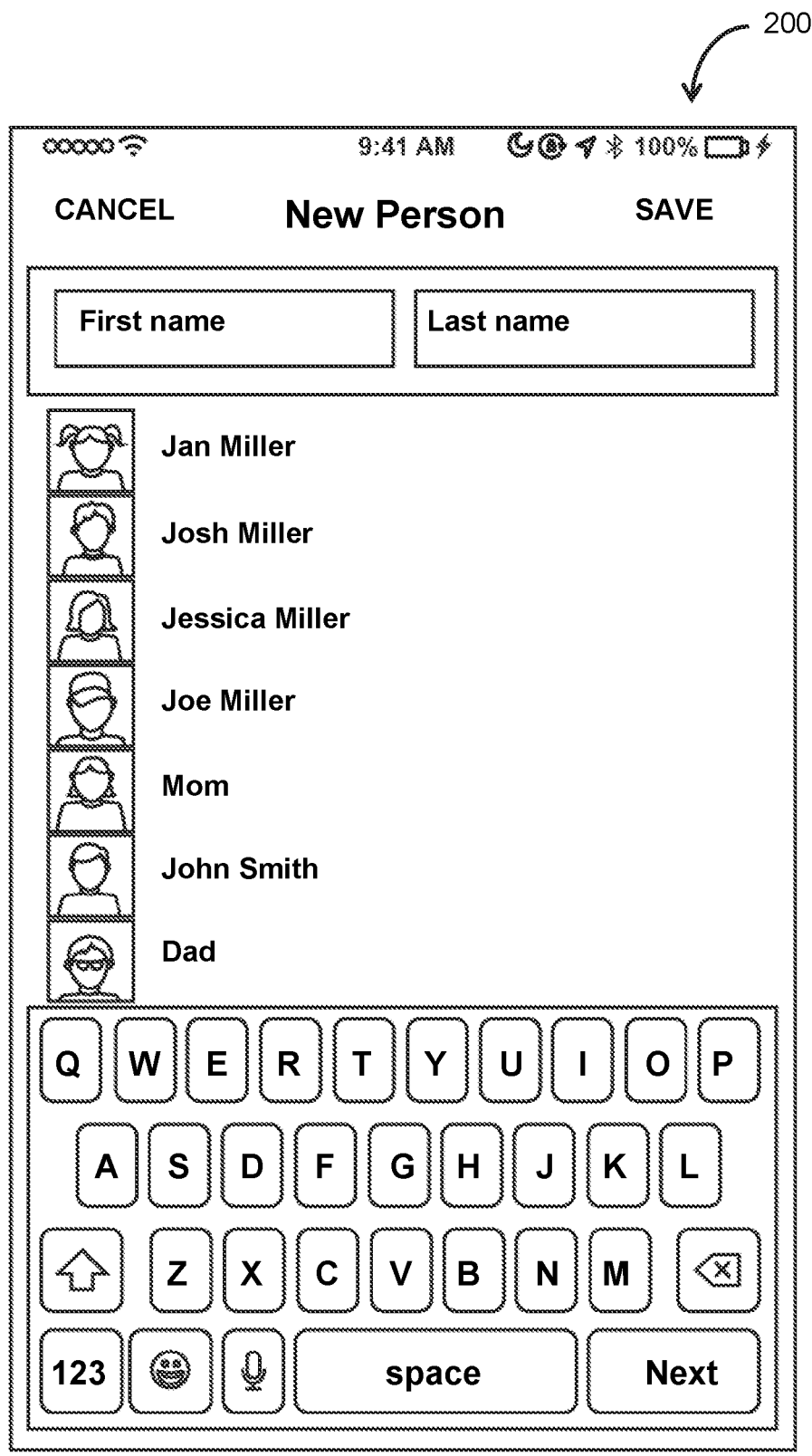
Figure 2G:
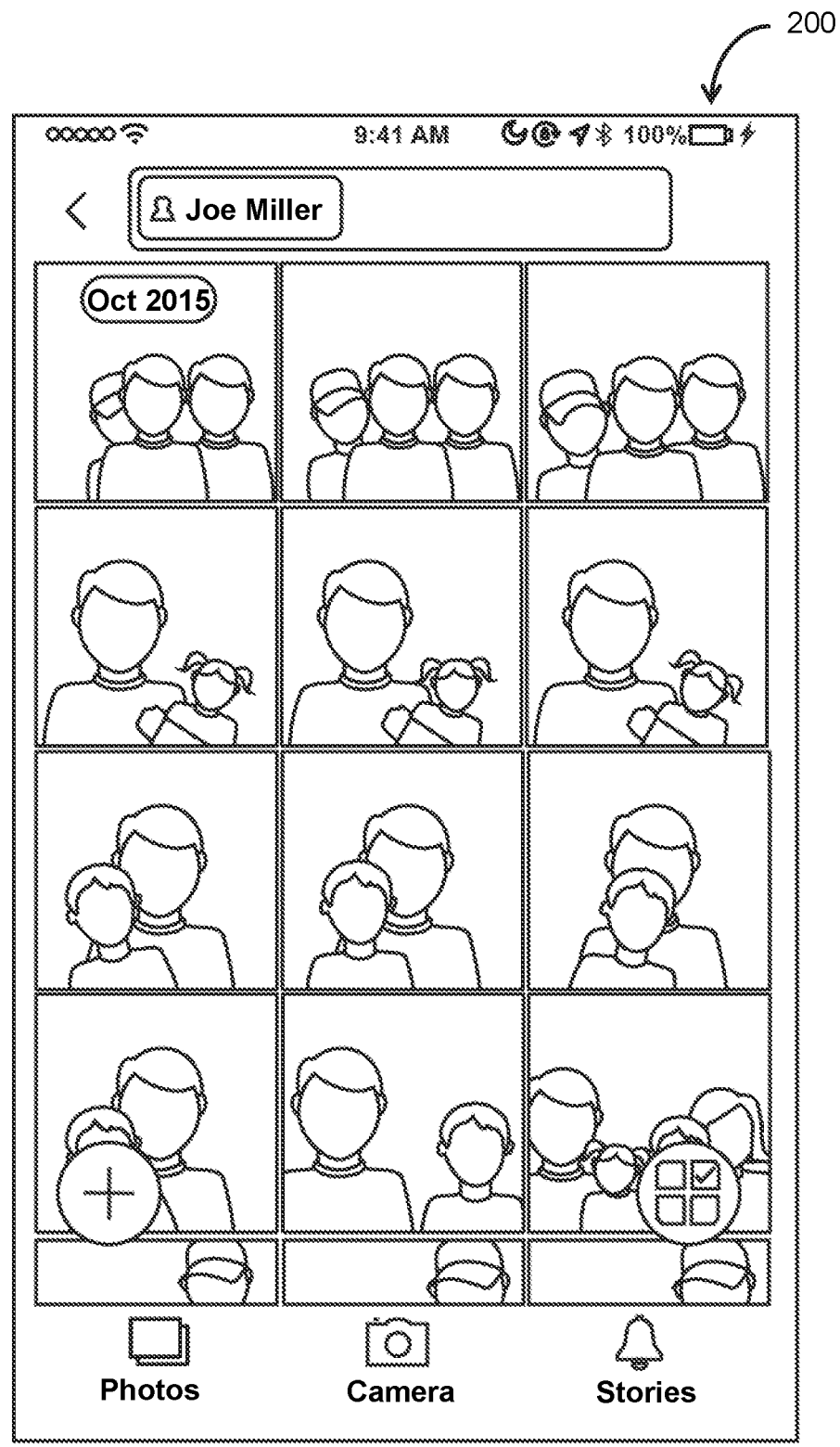

FIGS. 2A, 2B, 2C, 2D, 2E, 2F, and 2G illustrate a user interface 200, in accordance with one or more implementations. In FIG. 2A, user interface 200 presents concept categories including people category 202. In FIG. 2B, responsive to people category 202 being selected, user interface 200 shows representations of media items conveying identified individuals as well as an add-new-person tab 204. In FIG. 2C, responsive to add-new-person tab 204 being selected, user interface 200 shows representations of individuals, which are taken from a media item repository. In FIG. 2D, representation 206 is selected as a new person for system 100 to learn. In FIG. 2E, responsive to representation 206 being selected, the other on-screen representations are updated to be more relevant to the person shown in representation 206 (e.g., based on the media items, represented by the other on-screen representations, having characteristics similar to the media item represented by the selected representation 206). Also, in FIG. 2E, additional representations 208 are selected as positive examples of the person shown in representation 206. In addition, the non-selected representations 210 serve as negative examples of the person shown in representation 206. In FIG. 2F, responsive to the user attempting to enter a name for the person shown in representation 206, a contacts lists appears from which the user may select from. The user may manually enter the name for the person shown in representation 206. In FIG. 2G, the user interface 200 shows that the concept of the person shown in representation 206 has been learned by system 100. Indeed, the representations shown in FIG. 2G all correspond to the person shown in representation 206.

Figure 3A:
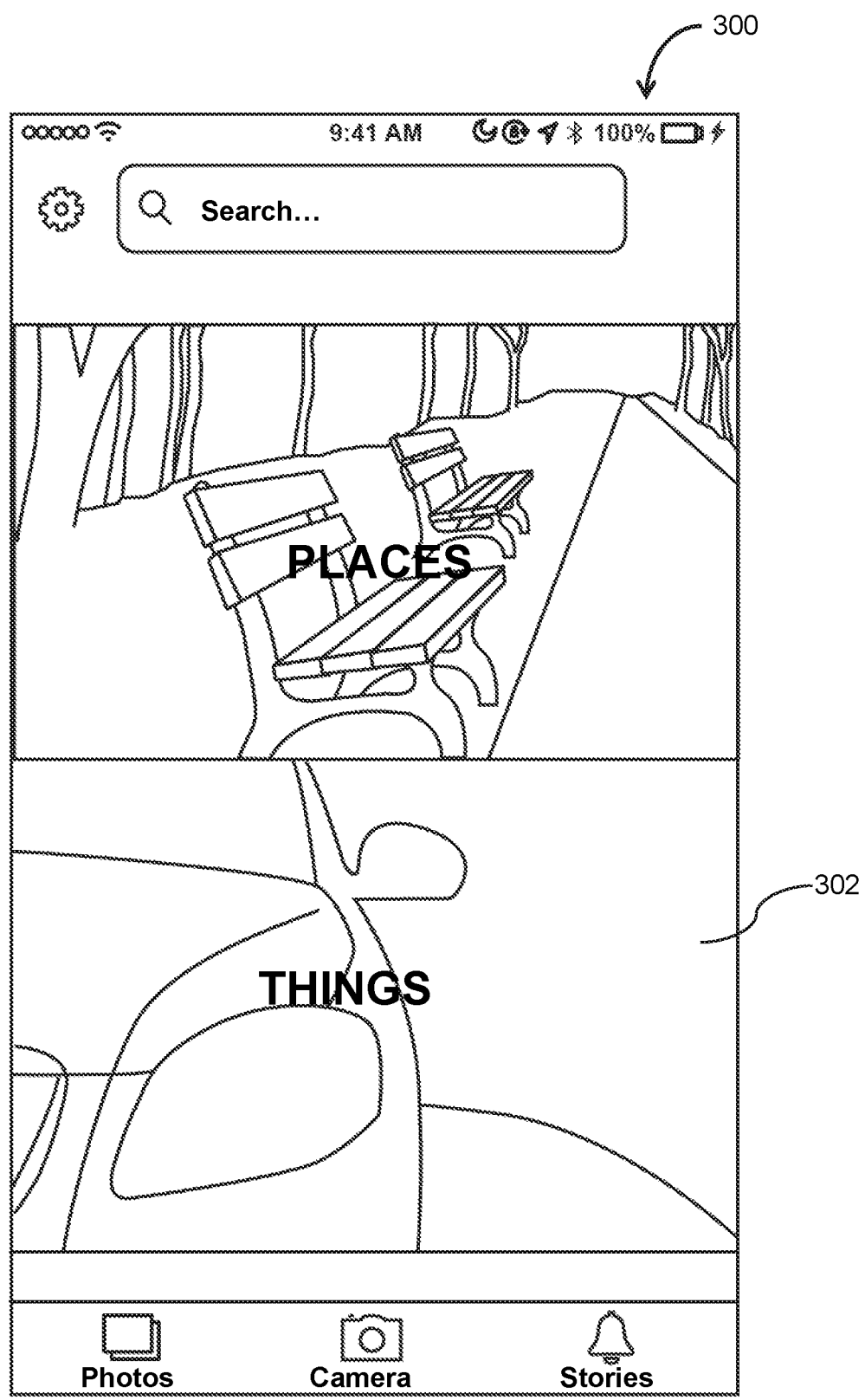
FIGS. 3A, 3B, 3C, 3D, 3E, 3F, and 3G illustrate a user interface, in accordance with one or more implementations.
Figure 3B:
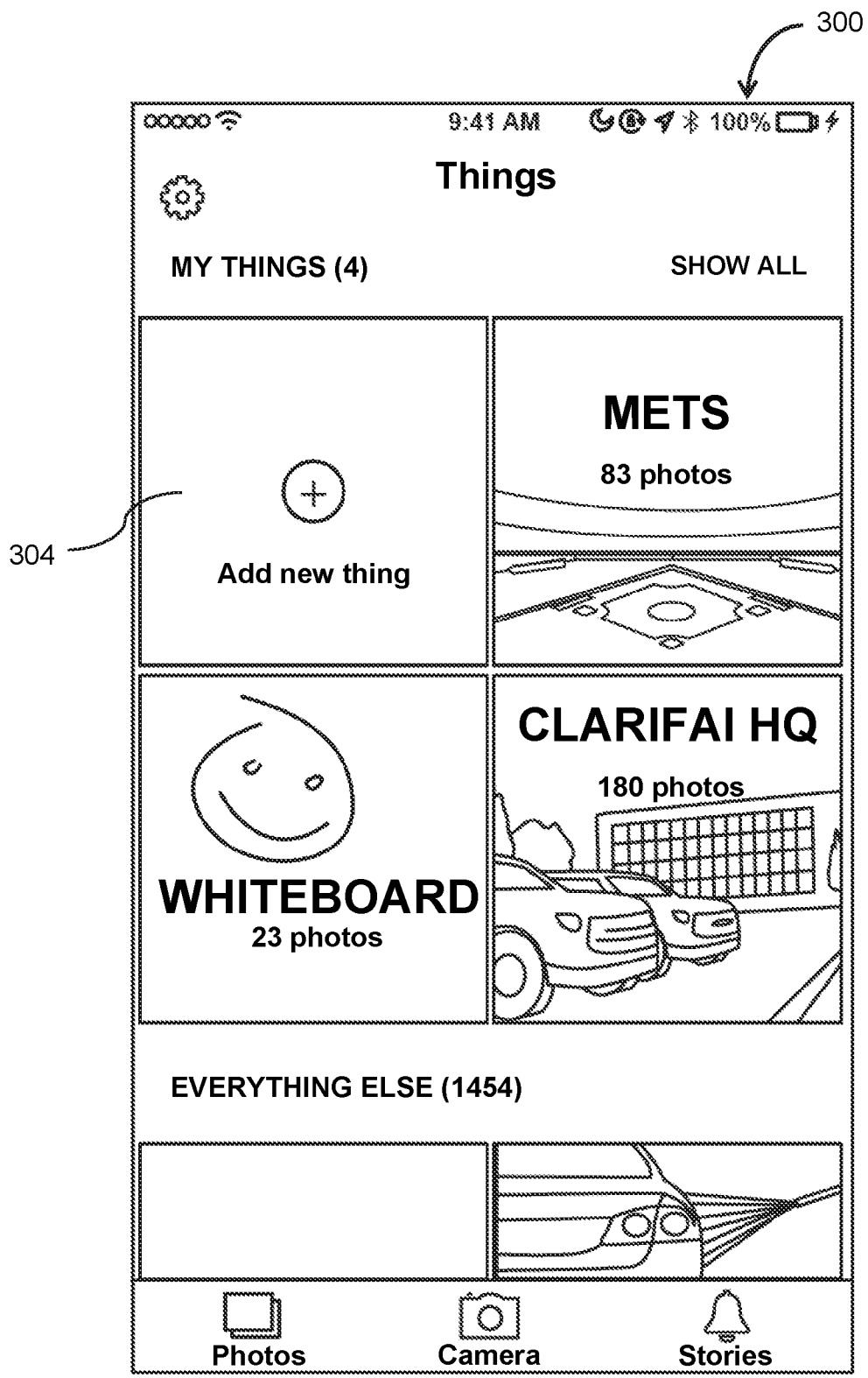
Figure 3C:
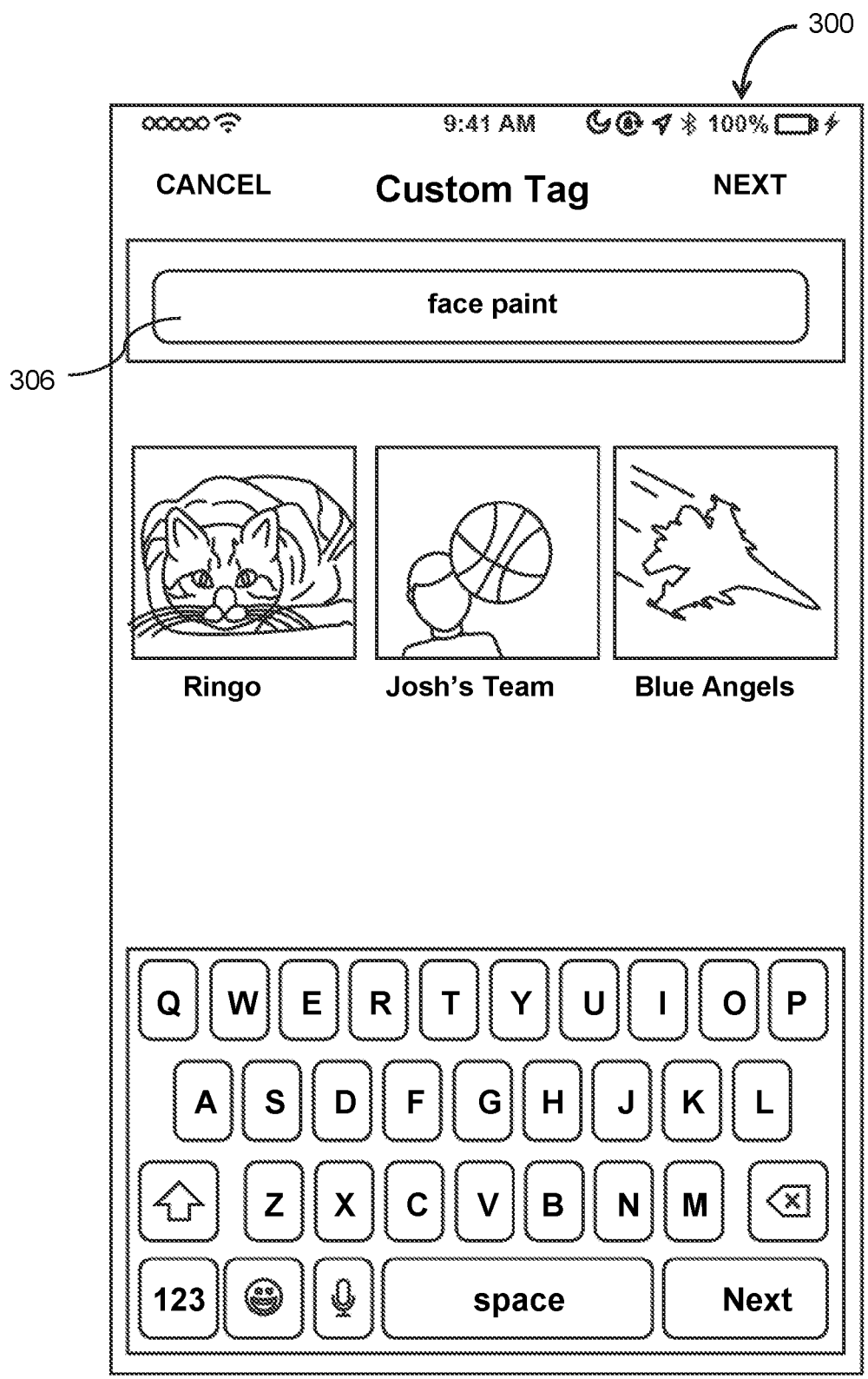
Figure 3D:
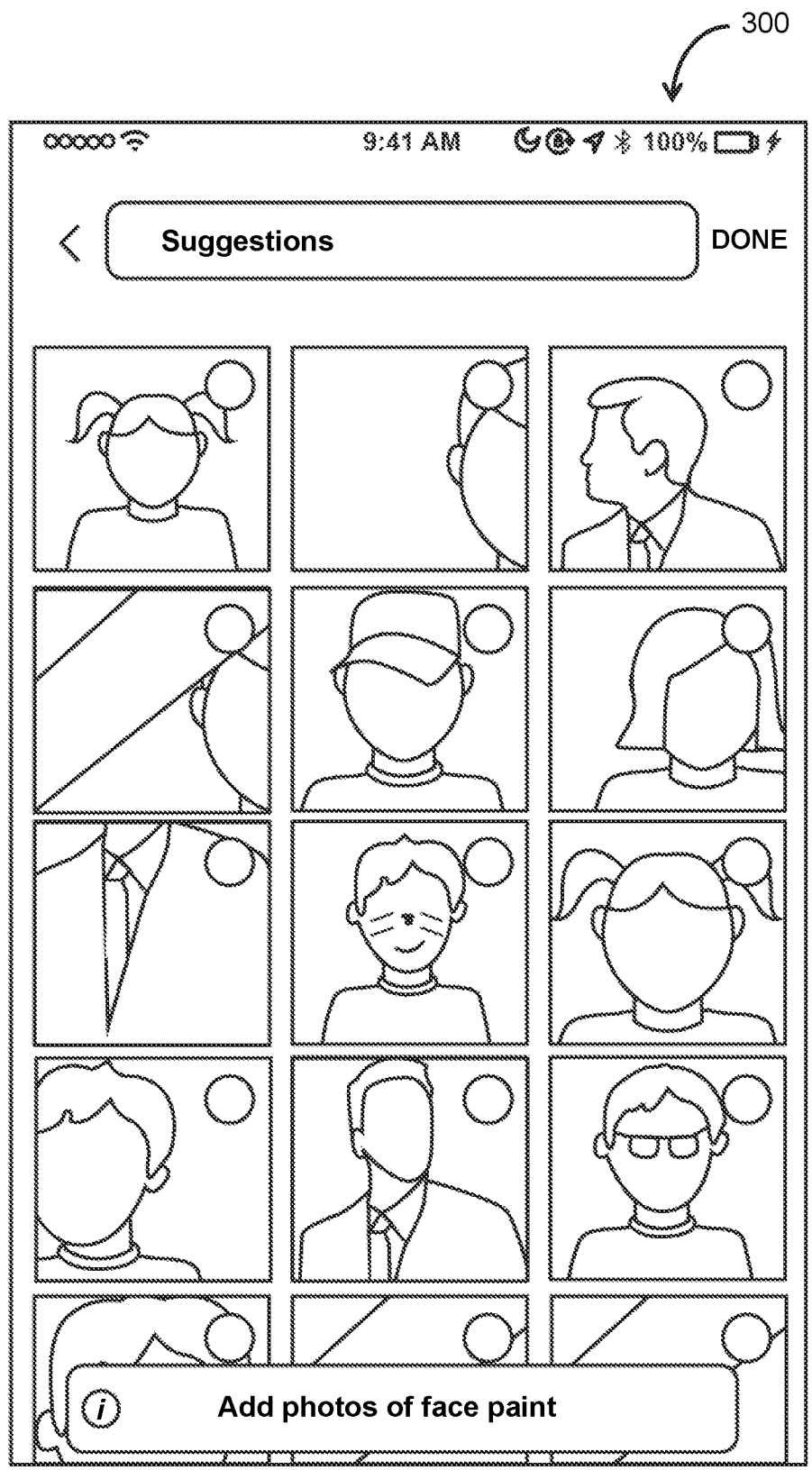
Figure 3E:
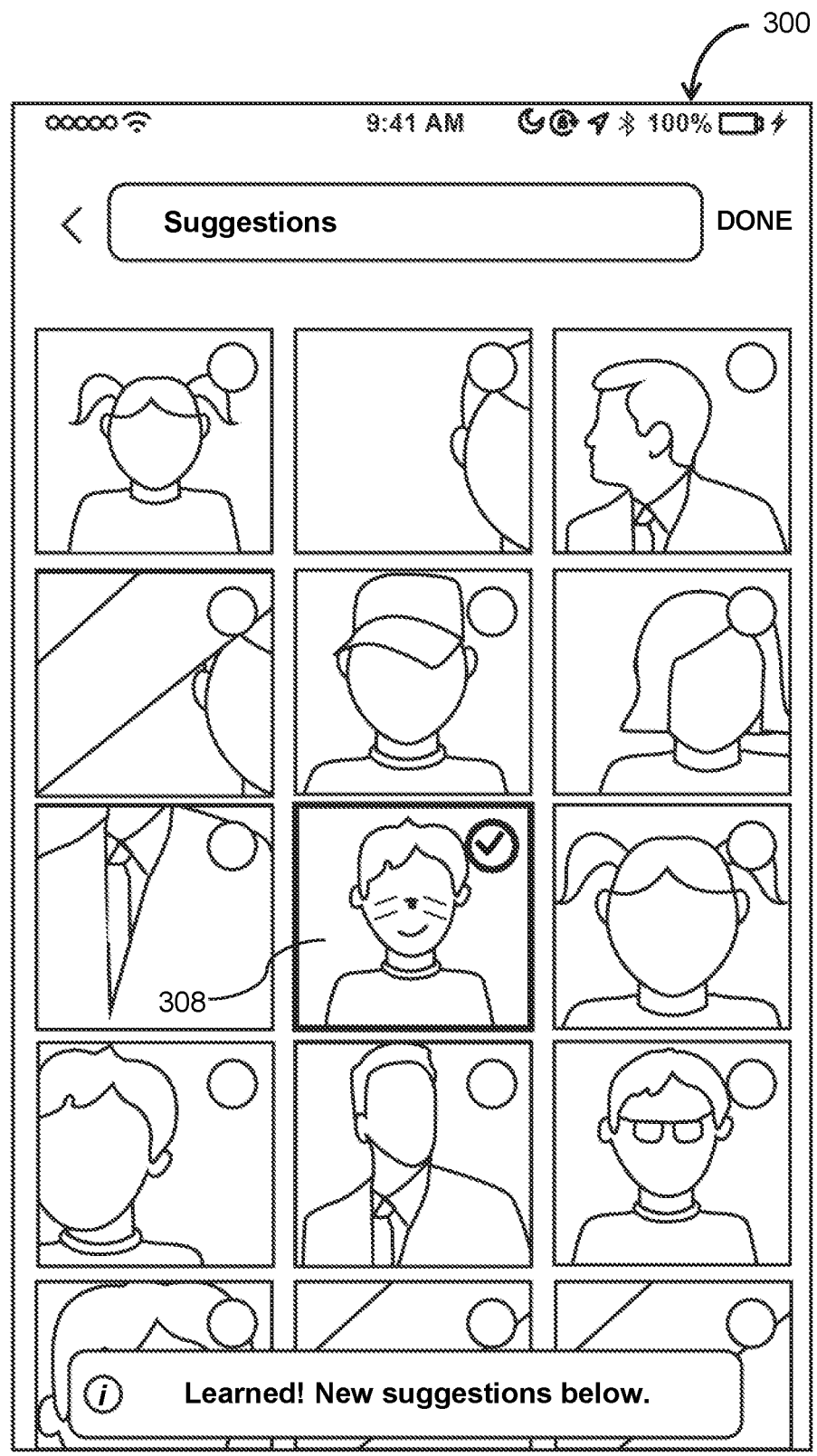
Figure 3F:
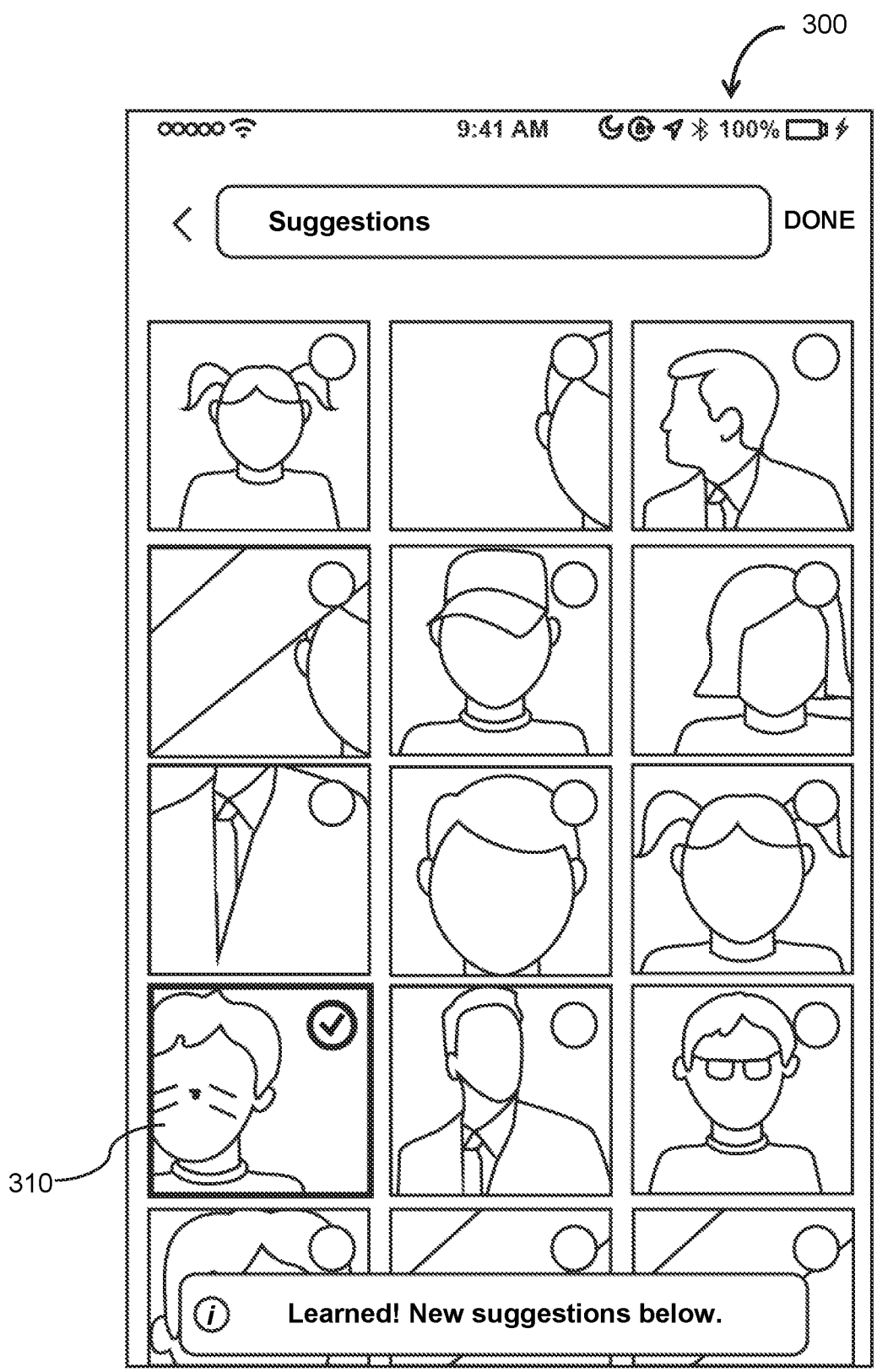
Figure 3G:
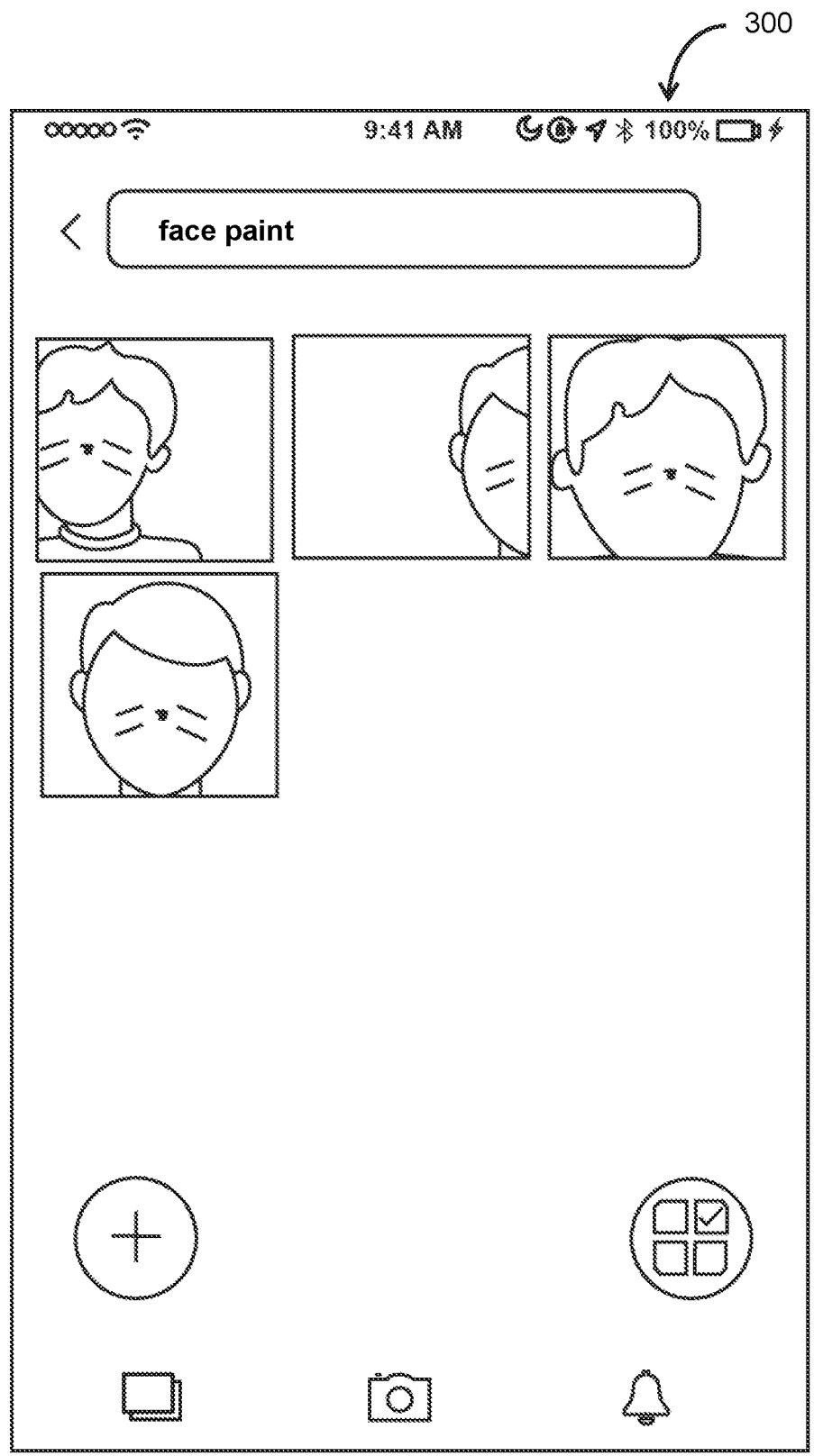

FIGS. 3A, 3B, 3C, 3D, 3E, 3F, and 3G illustrate a user interface 300, in accordance with one or more implementations. In FIG. 3A, user interface 300 presents concept categories including things category 302. In FIG. 3B, responsive to thing category 302 being selected, user interface 302 shows representations of media items conveying identified things as well as an add-new-thing tab 304. In FIG. 3C, responsive to add-new-thing tab 304 being selected, user interface 300 may allow the user to define a new thing to be learned by system 100. Here, the user has entered "face paint" into field 306 as the new thing to be learned. In FIG. 3D, user interface 300 presents several initial recommendations of media items that may or may not convey face paint. In FIG. 3E, recommendation 308 is selected as a positive example of a media item conveying face paint. In FIG. 3F, responsive to recommendation 308 being selected, the other on-screen and off-screen recommendations are updated to be more relevant to face paint. Recommendation 310 is also selected as conveying face paint. In FIG. 3G, the user interface 300 shows that the concept of face paint has been learned by system 100. Indeed, the representations shown in FIG. 3G all correspond to the media items conveying face paint.

In some implementations, as indicated in FIGS. 3E and 3F, when recommendation 308 is selected, none of the on-screen recommendations (in the portion of user interface 300 shown in FIGS. 3E and 3F that is in-view or visible to the user) that were not selected were removed from the current set of on-screen recommendations. In some implementations, as indicated in FIGS. 3E and 3F, only the selected recommendation 308 is removed from the current set of on-screen recommendations. A new media item is identified (e.g., based on the new media item having characteristics similar to the selected media item represented by the selected recommendation 308), and a recommendation of the new media item is provided in the current set of on-screen recommendations (e.g., replacing the selected recommendation in the current set of on-screen recommendations). In this way, for example, a user selection of one recommendation (or a subset of recommendations) presented in the on-screen user interface portion to indicate the recommendation as a positive example does not necessarily preclude the user from selecting one or more other recommendations in the on-screen user interface portion as positive examples.

In some implementations, in another use case with respect to FIG. 3E, when recommendation 308 is selected, none of the on-screen recommendations (in the portion of user interface 300 shown in FIGS. 3E and 3F that is in-view or visible to the user)—including the selected recommendation—is removed from the on-screen user interface portion. As such, for example, a user selection of one recommendation (or a subset of recommendations) presented in the on-screen user interface portion to indicate the recommendation as a positive example does not necessarily preclude the user from seeing what has been selected, preclude the user from unselecting the selected recommendation, etc.

In some implementations, with respect to FIG. 3E, one or more of the on-screen recommendations (in the portion of user interface 300 shown in FIG. 3E that is in-view or visible to the user) may be reordered or moved around on the on-screen user interface portion such that that one or more of the on-screen recommendations may be in a different order (as compared to immediately prior to the user selection of recommendation 308) or one or more of the on-screen recommendations may be in a different position on the on-screen user interface portion (as compared to immediately prior to the user selection of recommendation 308).

In some implementations, with respect to FIG. 3E, responsive to recommendation 308 being selected, one or more off-screen recommendations (in a portion of user interface 300 not in-view or visible to the user) may be (i) removed from the off-screen user interface portion, (ii) replaced with one or more new recommendations (e.g., based on the new media items represented by the new recommendations having characteristics similar to the selected media item represented by the selected recommendation 308), (iii) reordered or moved around on the off-screen user interface portion, (iv) or affected in other ways. Thus, for example, when the user scrolls or otherwise cause the current portion of the user interface that is on-screen to change (such that the current on-screen portion includes the portion of the user interface that was previously off-screen), the user may immediately see the updated recommendations of the previously-off-screen portion without necessarily having to see one or more of the old recommendations (e.g., that may not have been relevant to the faint paint concept).

In some implementations, with respect to FIG. 3E, a set of recommendations designated for an off-screen portion of user interface 300 that is not visible to the first user. In some implementations, although the designated recommendation set may not yet be loaded in the off-screen user interface portion, the designated recommendation set may be loaded on the off-screen user interface portion responsive to detecting that user interface portion becoming an on-screen portion (e.g., based on a user scrolling, clicking a link, or otherwise initiating an action that causes the user interface portion to become visible to the user). In one use case, with respect to FIG. 3E, responsive to recommendation 308 being selected, one or more of the not-yet-loaded recommendations of the designated set may be (i) removed from the designated set, (ii) replaced with one or more new recommendations (e.g., based on the new media items represented by the new recommendations having characteristics similar to the selected media item represented by the selected recommendation 308), (iii) reordered or moved to a different position at the designated user interface portion, (iv) or affected in other ways. As such, for example, when the user scrolls or otherwise cause the current portion of the user interface that is on-screen to change (such that the current on-screen portion includes the portion of the user interface that was previously off-screen), the user may see the updated recommendations of the designated set without necessarily having to see one or more of the old recommendations (e.g., that may not have been relevant to the faint paint concept).

In some implementations, with respect to FIG. 3E, a user may select only a portion of a recommended media item. As an example, the user may select only the middle portion of representation 308 that includes the painted part of the person's face (e.g., by loading a larger version of representation 308 and "cropping" the middle portion). Responsive to the user selection of the middle portion of representation 308, one or more recommended media items may be identified for presentation on the user interface (e.g., to be added to be recommended set of media items on user interface 300, to replace another recommended item on user interface 300, etc.). In one use case, for instance, the recommended media items may be identified as new additions or replacements for currently-presented media items based on the identified recommended media items having characteristics similar to the selected corresponding middle portion of the media item represented by representation 308. In another use case, the characteristics of the middle portion may be given a higher weight (e.g., giving higher weight to the diversity of colors of the face paint, the part of the face that is painted, etc.), while the characteristics of other non-selected portions may be given less weight or no weight (e.g., giving less or no weight to the person's hair, the person's chin, etc.), in the determination of whether other media item should be selected as new additions or replacements for currently-presented media items.

While implementations are described herein in the context of media items, this is not intended to be limiting. Indeed, in some implementations, system 100 may be used to recommend any type of items to a user based on a given interaction and/or a history of interaction with other items. By way of non-limiting example, some implementations may be applicable to e-commerce shopping applications, travel applications, sorting through large datasets for content to find what a user is looking for based on the previously selected items that the user approves of, location-based recommendations based on a user's current or past locations, and/or other applications.

Figure 4:
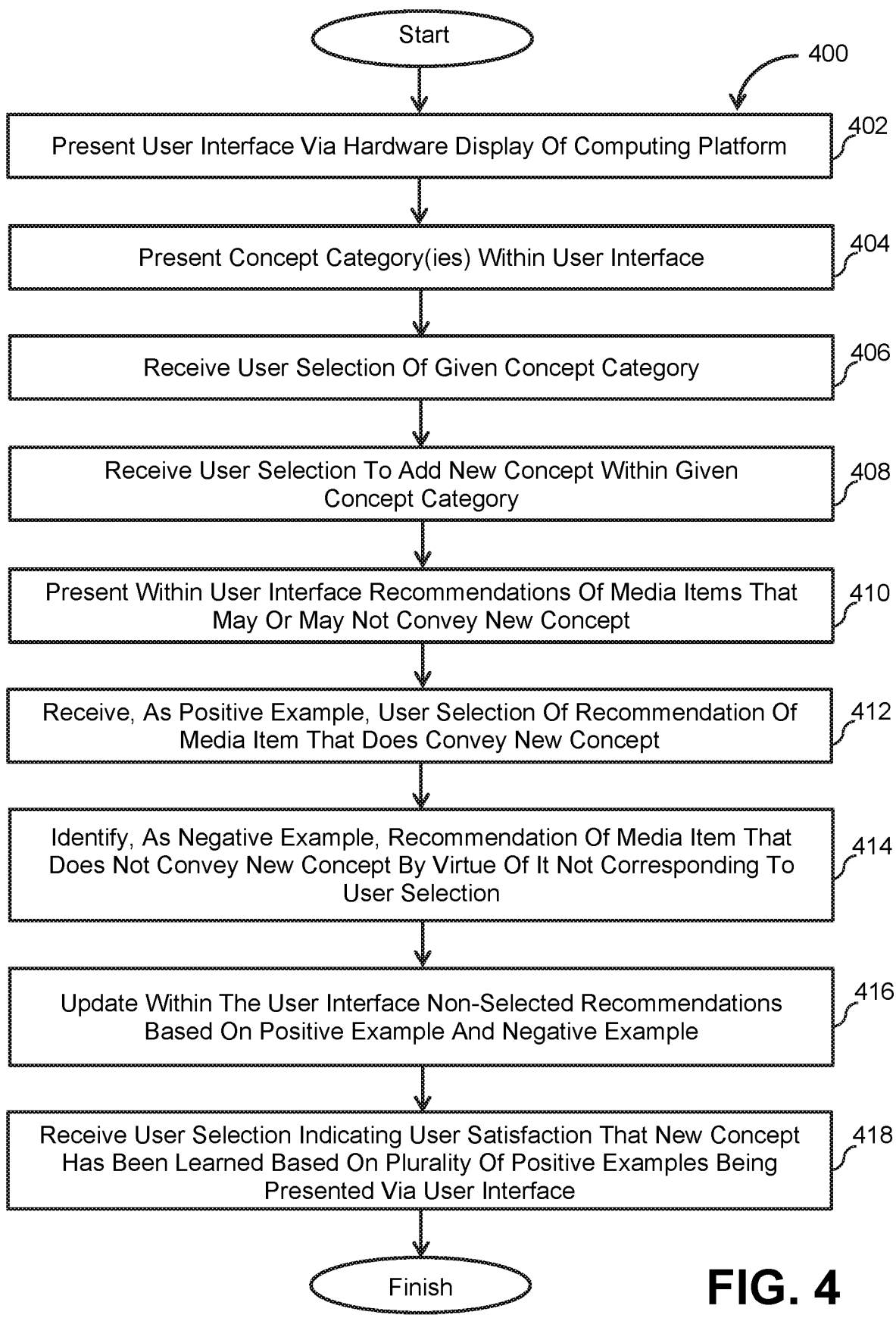
FIG. 4 illustrates a method for providing a user interface that facilitates learning user preferences via real-time recommendations of media items based on positive examples identified by user selections and negative examples identified by lack of user selections, in accordance with one or more implementations.

FIG. 4 illustrates a method 400 for providing a user interface that facilitates learning user preferences via real-time recommendations of media items based on positive examples identified by user selections and negative examples identified by lack of user selections, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, a user interface may be presented via a hardware display of a computing platform. Operation 402 may be performed by one or more processors configured by a machine-readable instruction component that is the same as or similar to user interface component 108, in accordance with one or more implementations.

At an operation 404, one or more concept categories may be presented within the user interface. Operation 404 may be performed by one or more processors configured by a machine-readable instruction component that is the same as or similar to concept category component 110, in accordance with one or more implementations.

At an operation 406, a user selection of a given concept category may be received. Operation 406 may be performed by one or more processors configured by a machine-readable instruction component that is the same as or similar to concept category component 110, in accordance with one or more implementations.

At an operation 408, a user selection to add a new concept within the given concept category may be received. Operation 408 may be performed by one or more processors configured by a machine-readable instruction component that is the same as or similar to new concept component 112, in accordance with one or more implementations.

At an operation 410, recommendations of media items that may or may not convey the new concept may be presented within the user interface. Operation 410 may be performed by one or more processors configured by a machine-readable instruction component that is the same as or similar to recommendation component 114, in accordance with one or more implementations.

At an operation 412, a user selection of a recommendation of a media item that does convey the new concept may be received as a positive example. Operation 412 may be performed by one or more processors configured by a machine-readable instruction component that is the same as or similar to positive/negative example component 116, in accordance with one or more implementations.

At an operation 414, a recommendation of a media item that does not convey the new concept may be identified as a negative example by virtue of it not corresponding to a user selection. Operation 414 may be performed by one or more processors configured by a machine-readable instruction component that is the same as or similar to positive/negative example component 116, in accordance with one or more implementations.

At an operation 416, non-selected recommendations may be updated within the user interface based on the positive example and the negative example. Operation 416 may be performed by one or more processors configured by a machine-readable instruction component that is the same as or similar to recommendation component 114, in accordance with one or more implementations.

At an operation 418, a user selection may be received indicating user satisfaction that the new concept has been learned based on a plurality of positive examples being presented via the user interface. Operation 418 may be performed by one or more processors configured by a machine-readable instruction component that is the same as or similar to new concept component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Implementations will be better understood with reference to the following enumerated implementations:

1. A system comprising: one or more hardware processors configured by machine-readable instructions to: cause a set of media item recommendations to be loaded on a user interface for presentation to a user, the media item recommendation set comprising a set of recommendations loaded on an on-screen portion of the user interface and a set of recommendations loaded on an off-screen portion of the user interface, the on-screen user interface portion being visible to the user at a first time, and the off-screen user interface portion not being visible to the user at the first time; receive a user selection of one or more recommendations of the on-screen recommendation set; identify, based on the user recommendation selection, one or more recommendations of the on-screen recommendation set that are not included in the user recommendation selection; and cause, based on the user recommendation selection, the off-screen recommendation set to be updated on the user interface during the presentation of the media item recommendation set.

2. The system of implementation 1, wherein no removal, from the on-screen recommendation set loaded on the on-screen user interface portion visible to the user at the first time, of a recommendation of the on-screen recommendation set that is not included in the user recommendation selection occurs from the user recommendation selection.

3. The system of implementation 1, wherein the one or more hardware processors are configured by machine-readable instructions to cause, based on the user recommendation selection, the on-screen recommendation set loaded on the on-screen user interface portion visible to the user at the first time to be updated on the user interface during the presentation of the media item recommendation set.

4. The system of implementation 1, wherein the one or more hardware processors are configured by machine-readable instructions to cause the off-screen recommendation set to be updated by causing, based on the user recommendation selection, the off-screen recommendation set to be updated on the user interface before receiving a user manipulation of the user interface that causes at least some of the off-screen user interface portion not visible to the user at the first time to become visible to the user.

5. The system of implementation 4, wherein the user manipulation corresponds to a user request to bring on-screen on the user interface at least some of the off-screen user interface portion not visible to the user at the first time.

6. The system of implementation 4, wherein the user manipulation corresponds to user scrolling.

7. The system of implementation 1, wherein the one or more hardware processors are configured by machine-readable instructions to: identify one or more new recommendations as having one or more characteristics similar to one or more recommendations of the on-screen recommendation set that are included in the user recommendation selection; and cause the off-screen recommendation set to be updated on the user interface by causing the off-screen recommendation set to be updated with the new recommendations during the presentation of the media item recommendation set.

8. The system of implementation 7, wherein the one or more hardware processors are configured by machine-readable instructions to identify the new recommendations for updating the media item recommendation set based on the new recommendations being more similar to one or more recommendations of the on-screen recommendation set that are included in the user recommendation selection than one or more recommendations of the on-screen recommendation set that are not included in the user recommendation selection.

9. The system of implementation 1, wherein the one or more hardware processors are configured by machine-readable instructions to cause the off-screen recommendation set to be updated on the user interface by causing, based on the user recommendation selection, one or more recommendations of the off-screen recommendation set to be replaced with one or more new recommendations during the presentation of the media item recommendation set.

10. The system of implementation 1, wherein the one or more hardware processors are configured by machine-readable instructions to cause the off-screen recommendation set to be updated on the user interface by causing, based on the user recommendation selection, reordering of recommendations of the off-screen recommendation set during the presentation of the media item recommendation set.

11. The system of implementation 1, wherein the one or more hardware processors are further configured by machine-readable instructions to: identify, as positive examples, based on the user recommendation selection, one or more recommendations of the on-screen recommendation set that are included in the user recommendation selection; and generate an indication on the user interface that the new concept has been learned based on a threshold number of positive examples being identified during the presentation of the media item recommendation set.

12. The system of implementation 1, wherein the one or more hardware processors are configured by machine-readable instructions to cause the media item recommendation set to be loaded on the user interface by causing graphical representations of recommended media items to be loaded on the user interface for presentation to the user.

13. The system of implementation 12, wherein the graphical representations of the recommended media items comprises thumbnail images of the recommended media items.

14. The system of implementation 12, wherein the recommended media items comprises one or more of images, animations, videos, or audios.

15. The system of implementation 1, wherein the one or more hardware processors are configured by machine-readable instructions to receive a user request to add a new concept, the user request to add the new concept comprising a user-provided definition of the new concept, and the user-provided definition comprising one or more words describing the new concept.

16. The system of implementation 1, wherein the one or more hardware processors are configured by machine-readable instructions to: cause a set of concept categories to be presented on the user interface; and receive a user selection of a concept category of the concept category set, wherein the user request to add the new concept is a request to add the new concept to the user-selected concept category.

17. The system of implementation 16, wherein concept categories of the concept category set are represented as category tiles on the user interface.

18. The system of implementation 16, wherein concept categories of the concept category set comprises one or more of recently created concepts, people, places, things, times, favorites, interests, or categories provided by other users.

19. A method being performed by one or more hardware processors configured by machine-readable instructions that, when executed by the one or more hardware processors, perform the method, the method comprising: causing a set of media item recommendations to be loaded on a user interface for presentation to a user, the media item recommendation set comprising a set of recommendations loaded on an on-screen portion of the user interface and a set of recommendations loaded on an off-screen portion of the user interface, the on-screen user interface portion being visible to the user at a first time, and the off-screen user interface portion not being visible to the user at the first time; receiving a user selection of one or more recommendations of the on-screen recommendation set; identifying, based on the user recommendation selection, one or more recommendations of the on-screen recommendation set that are not included in the user recommendation selection; and causing, based on the user recommendation selection, the off-screen recommendation set to be updated on the user interface during the presentation of the media item recommendation set.

20. The method of implementation 19, wherein no removal, from the on-screen recommendation set loaded on the on-screen user interface portion visible to the user at the first time, of a recommendation of the on-screen recommendation set that is not included in the user recommendation selection occurs from the user recommendation selection.

21. The system of implementation 19, the method further comprising cause, based on the user recommendation selection, the on-screen recommendation set loaded on the on-screen user interface portion visible to the user at the first time to be updated on the user interface during the presentation of the media item recommendation set.

22. The method of implementation 19, wherein causing the off-screen recommendation set to be updated comprises causing, based on the user recommendation selection, the off-screen recommendation set to be updated on the user interface before receiving a user manipulation of the user interface that causes at least some of the off-screen user interface portion not visible to the user at the first time to become visible to the user.

23. The method of implementation 22, wherein the user manipulation corresponds to a user request to bring on-screen on the user interface at least some of the off-screen user interface portion not visible to the user at the first time.

24. The method of implementation 22, wherein the user manipulation corresponds to user scrolling.

25. The method of implementation 19, the method further comprising identifying one or more new recommendations as having one or more characteristics similar to one or more recommendations of the on-screen recommendation set that are included in the user recommendation selection, wherein causing the off-screen recommendation set to be updated on the user interface comprises causing the off-screen recommendation set to be updated with the new recommendations during the presentation of the media item recommendation set.

26. The method of implementation 25, wherein identifying the new recommendations comprises identifying the new recommendations for updating the media item recommendation set based on the new recommendations being more similar to one or more recommendations of the on-screen recommendation set that are included in the user recommendation selection than one or more recommendations of the on-screen recommendation set that are not included in the user recommendation selection.

27. The method of implementation 19, wherein causing the off-screen recommendation set to be updated on the user interface comprises causing, based on the user recommendation selection, one or more recommendations of the off-screen recommendation set to be replaced with one or more new recommendations during the presentation of the media item recommendation set.

28. The method of implementation 19, wherein causing the off-screen recommendation set to be updated on the user interface comprises causing, based on the user recommendation selection, reordering of recommendations of the off-screen recommendation set during the presentation of the media item recommendation set.

29. The method of implementation 19, the method further comprising: identifying, as positive examples, based on the user recommendation selection, one or more recommendations of the on-screen recommendation set that are included in the user recommendation selection; and generating an indication on the user interface that the new concept has been learned based on a threshold number of positive examples being identified during the presentation of the media item recommendation set.

30. The method of implementation 19, wherein causing the media item recommendation set to be loaded on the user interface comprising causing graphical representations of recommended media items to be loaded on the user interface for presentation to the user.

31. The method of implementation 30, wherein the graphical representations of the recommended media items comprises thumbnail images of the recommended media items.

32. The method of implementation 30, wherein the recommended media items comprises one or more of images, animations, videos, or audios.

33. The method of implementation 19, the method further comprising receiving a user request to add a new concept, the user request to add the new concept comprising a user-provided definition of the new concept, and the user-provided definition comprising one or more words describing the new concept.

34. The method of implementation 33, wherein the one or more hardware processors are configured by machine-readable instructions to: cause a set of concept categories to be presented on the user interface; and receive a user selection of a concept category of the concept category set, wherein the user request to add the new concept is a request to add the new concept to the user-selected concept category.

35. The method of implementation 34, wherein concept categories of the concept category set are represented as category tiles on the user interface.

36. The method of implementation 34, wherein concept categories of the concept category set comprises one or more of recently created concepts, people, places, things, times, favorites, interests, or categories provided by other users.

37. A system comprising: one or more hardware processors configured by machine-readable instructions to perform any combination of features of implementations 19-36 to the extent possible.

38. A method A method being performed by one or more hardware processors configured by machine-readable instructions that, when executed by the one or more hardware processors, perform the method, the method comprising any combination of features of implementations 19-36 to the extent possible.

39. A tangible, machine-readable, non-transitory media storing instructions that, when executed, cause a data processing apparatus to effectuate any combination of features of implementations 19-36 to the extent possible.

What is claimed is:

1. A system for updating, on a user interface, recommendations in real-time based on user selection of media item recommendations provided via the user interface, the system comprising:
   one or more hardware processors configured by machine-readable instructions to:
   receive a user request to add a new concept that is to be learned by a neural network;
   cause a set of media item recommendations to be loaded on a user interface for presentation to a user responsive to the user request to add the new concept, the media item recommendation set comprising a set of recommendations loaded on an on-screen portion of the user interface and a set of recommendations loaded on an off-screen portion of the user interface, the on-screen user interface portion being visible to the user at a first time, and the off-screen user interface portion not being visible to the user at the first time;
   receive a user selection of one or more recommendations of the on-screen recommendation set;
   identify, based on the user recommendation selection, one or more recommendations of the on-screen recommendation set that are not included in the user recommendation selection as recommendations that do not convey the new concept, the identified recommendations not included in the user recommendation selection being recommendations that are not selected by the user;
   cause, based on the identified recommendations not included in the user recommendation selection, the off-screen recommendation set to be updated in real-time on the off-screen user interface portion during the presentation of the media item recommendation set;
   cause, based on a user manipulation of the user interface, at least some of the updated off-screen user recommendation set to become visible to the user;
   identify, as positive examples of the new concept, based on the user recommendation selection, one or more recommendations of the on-screen recommendation set that are included in the user recommendation selection; and
   generate an indication on the user interface that a threshold relating to the neural network has been satisfied, the indication being generated based on a threshold number of positive examples of the new concept being identified during the presentation of the media item recommendation set.

2. The system of claim 1, wherein no removal, from the on-screen recommendation set loaded on the on-screen user interface portion visible to the user at the first time, of a recommendation of the on-screen recommendation set that is not included in the user recommendation selection occurs from the user recommendation selection.

3. The system of claim 1, wherein the one or more hardware processors are configured by machine-readable instructions to:
   cause, based on the user recommendation selection, the on-screen recommendation set loaded on the on-screen user interface portion visible to the user at the first time to be updated on the user interface during the presentation of the media item recommendation set,
   wherein the updating of the on-screen recommendation set comprises removing one or more recommendations from the on-screen recommendation set loaded on the on-screen user interface portion visible to the user at the first time, and
   wherein the removal is configured to occur before receiving the user manipulation of the user interface that causes at least some of the off-screen user interface portion not visible to the user at the first time to become visible to the user.

4. The system of claim 1, wherein the one or more hardware processors are configured by machine-readable instructions to:
cause, based on the user recommendation selection, the on-screen recommendation set loaded on the on-screen user interface portion visible to the user at the first time to be updated on the user interface during the presentation of the media item recommendation set,
wherein the updating of the on-screen recommendation set comprises reordering one or more recommendations of the on-screen recommendation set loaded on the on-screen user interface portion visible to the user at the first time.

5. The system of claim 1, wherein the one or more hardware processors are configured by machine-readable instructions to:
cause the off-screen recommendation set to be updated by causing, based on the user recommendation selection, the off-screen recommendation set to be updated on the user interface,
wherein the updating of the off-screen recommendation set is configured to occur before receiving the user manipulation of the user interface that causes at least some of the off-screen user interface portion not visible to the user at the first time to become visible to the user.

6. The system of claim 5, wherein the user manipulation corresponds to a user request to bring on-screen on the user interface at least some of the off-screen user interface portion not visible to the user at the first time, the user request being initiated based on user scrolling.

7. The system of claim 1, wherein the one or more hardware processors are configured by machine-readable instructions to:
identify one or more new recommendations as having one or more characteristics similar to one or more recommendations of the on-screen recommendation set that are included in the user recommendation selection; and
cause the off-screen recommendation set to be updated on the user interface by causing the off-screen recommendation set to be updated with the new recommendations during the presentation of the media item recommendation set.

8. The system of claim 7, wherein the one or more hardware processors are configured by machine-readable instructions to identify the new recommendations for updating the media item recommendation set based on the new recommendations being more similar to one or more recommendations of the on-screen recommendation set that are included in the user recommendation selection than one or more recommendations of the on-screen recommendation set that are not included in the user recommendation selection.

9. The system of claim 1, wherein the one or more hardware processors are configured by machine-readable instructions to:
cause the off-screen recommendation set to be updated on the user interface by causing, based on the user recommendation selection, one or more recommendations of the off-screen recommendation set to be replaced with one or more new recommendations during the presentation of the media item recommendation set.

10. The system of claim 1, wherein the one or more hardware processors are configured by machine-readable instructions to:
cause the off-screen recommendation set to be updated on the user interface by causing, based on the user recommendation selection, reordering of recommendations of the off-screen recommendation set during the presentation of the media item recommendation set,
wherein the reordering of recommendations of the off-screen recommendation set is configured to occur before receiving the user manipulation of the user interface that causes at least some of the off-screen user interface portion not visible to the user at the first time to become visible to the user.

11. The system of claim 1, wherein the indication specifies that the new concept has been learned by the neural network.

12. The system of claim 1, wherein the user request to add the new concept comprises a user-provided definition of the new concept, the user-provided definition comprising one or more words describing the new concept.

13. The system of claim 1, wherein the one or more hardware processors are configured by machine-readable instructions to:
cause the media item recommendation set to be loaded on the user interface by causing graphical representations of recommended media items to be loaded on the user interface for presentation to the user,
wherein the graphical representations of the recommended media items comprises thumbnail images of the recommended media items.

14. The system of claim 1, wherein the one or more hardware processors are configured by machine-readable instructions to:
cause the media item recommendation set to be loaded on the user interface by causing graphical representations of recommended media items to be loaded on the user interface for presentation to the user,
wherein the recommended media items comprises one or more of images, animations, videos, or audios.

15. The system of claim 1, wherein the one or more hardware processors are configured by machine-readable instructions to:
cause a set of concept categories to be presented on the user interface; and
receive a user selection of a concept category of the set of concept categories,
wherein the user request to add the new concept is a request to add the new concept to the user-selected concept category.

16. The system of claim 15, wherein concept categories of the set of concept categories are represented as category tiles on the user interface.

17. The system of claim 15, wherein concept categories of the set of concept categories comprises one or more of recently created concepts, people, places, things, times, favorites, interests, or categories provided by other users.

18. A method for updating, on a user interface, recommendations in real-time based on user selection of media item recommendations provided via the user interface, the method being performed by one or more hardware processors configured by machine-readable instructions that, when executed by the one or more hardware processors, perform the method, the method comprising:
receiving a user request to add a new concept that is to be learned by a neural network;
causing a set of media item recommendations to be loaded on a user interface for presentation to a user responsive to the user request to add the new concept, the media item recommendation set comprising a set of recommendations loaded on an on-screen portion of the user interface and a set of recommendations loaded on an off-screen portion of the user interface, the on-screen user interface portion being visible to the user at a first time, and the off-screen user interface portion not being visible to the user at the first time;

receiving a user selection of one or more recommendations of the on-screen recommendation set;

identifying, based on the user recommendation selection, one or more recommendations of the on-screen recommendation set that are not included in the user recommendation selection as recommendations that do not convey the new concept, the identified recommendations not included in the user recommendation selection being recommendations that are not selected by the user;

causing, based on the identified recommendations not included in the user recommendation selection, the off-screen recommendation set to be updated in real-time on the off-screen user interface portion during the presentation of the media item recommendation set;

causing, based on a user manipulation of the user interface, at least some of the updated off-screen user recommendation set to become visible to the user;

identifying, as positive examples of the new concept, based on the user recommendation selection, one or more recommendations of the on-screen recommendation set that are included in the user recommendation selection; and generating an indication on the user interface that a threshold relating to the neural network has been satisfied, the indication being generated based on a threshold number of positive examples of the new concept being identified during the presentation of the media item recommendation set.

19. The method of claim 18, wherein no removal, from the on-screen recommendation set loaded on the on-screen user interface portion visible to the user at the first time, of a recommendation of the on-screen recommendation set that is not included in the user recommendation selection occurs from the user recommendation selection.

20. The method of claim 18, further comprising:
causing, based on the user recommendation selection, the on-screen recommendation set loaded on the on-screen user interface portion visible to the user at the first time to be updated on the user interface during the presentation of the media item recommendation set, wherein the updating of the on-screen recommendation set comprises removing one or more recommendations from the on-screen recommendation set loaded on the on-screen user interface portion visible to the user at the first time, and wherein the removal is configured to occur before receiving the user manipulation of the user interface that causes at least some of the off-screen user interface portion not visible to the user at the first time to become visible to the user.

* * * * *